July 16, 1968  W. HERRMANN  3,392,597
GEAR SHIFT LINKAGE FOR TILTABLE CAB
Filed May 13, 1966  2 Sheets-Sheet 1

INVENTOR
Wilhelm Herrmann

BY Bailey, Stephens and Huettig
ATTORNEYS

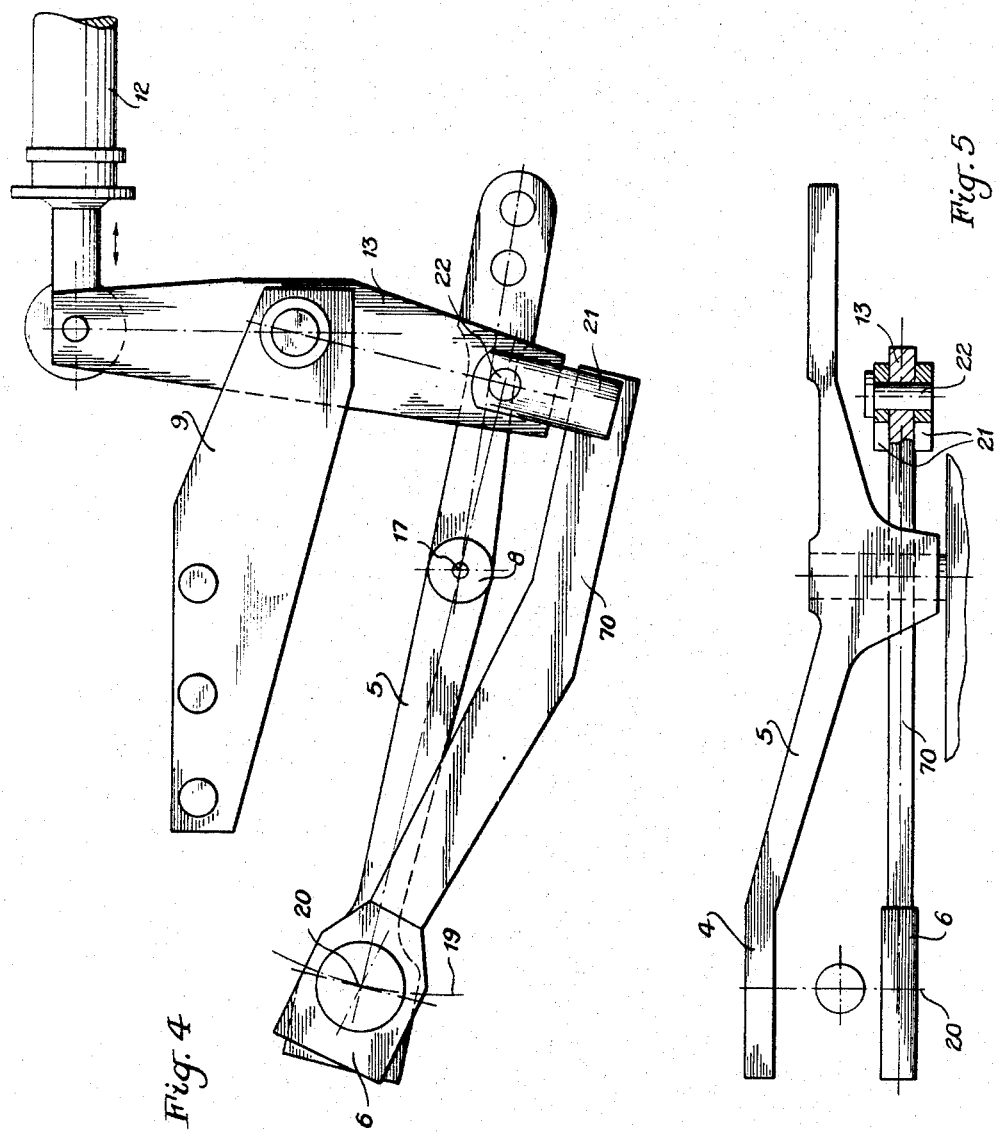

United States Patent Office 3,392,597
Patented July 16, 1968

3,392,597
GEAR SHIFT LINKAGE FOR TILTABLE CAB
Wilhelm Herrmann, Munich, Germany, assignor to Maschinenfabrik Augsburg-Nurnberg Aktiengesellschaft, Munich, Germany
Filed May 13, 1966, Ser. No. 550,049
Claims priority, application Germany, May 14, 1965,
M 65,246
1 Claim. (Cl. 74—473)

ABSTRACT OF THE DISCLOSURE

A tiltable cab for an automobile contains the gear shift lever and control rod mounted parallel to the steering wheel column. Two gear shift linkages lie on the tilting axis for the cab. When the control rod is turned, one linkage shifts the transmission gears. When the rod is moved along its longitudinal axis, the gear to be shifted is selected. The cab can be tilted while the gears are meshed.

---

Figure 1:
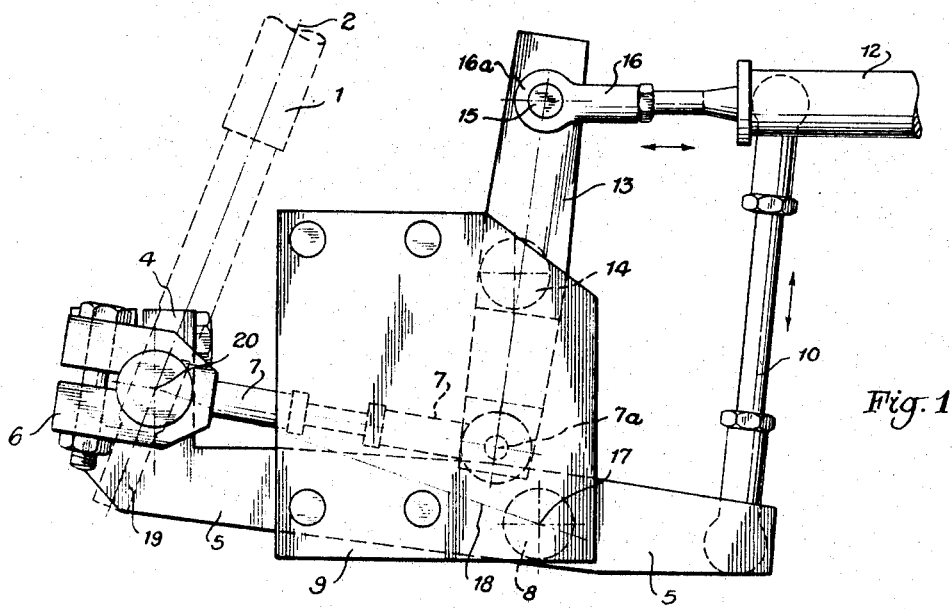

This invention relates to a gear shift linkage for a driver's cab on an automobile and, in particular, to a linkage by means of which the cab can be tilted without materially affecting the gear shift mechanism for the transmission gears.

In passenger vehicles, the gear shift lever is mounted adjacent the steering wheel and joined to a control rod which is parallel to the steering wheel column. The lower end of the control rod moves one or more parts of a linkage for shifting the transmission gears. For example, the desired transmission gear can be chosen by lifting the gear shift lever and thus moving the control rod along its longitudinal axis. By swinging the gear shift lever, the control rod is turned or rotated to shift the gear into the desired position. The longitudinal movement of the control rod is translated into a rotary movement of the gear shift shaft and the rotary movement of the control rod into a longitudinal movement of the gear shift shaft.

Such steering wheel column mounted gear shifts are being used in increasing numbers on trucks.

Also, a driver's cab tiltably mounted over the engine is being increasingly used in trucks. During the normal running operation of the vehicle, the cab is latched to the frame of the vehicle. In order to repair and maintain the parts of the vehicle beneath the cab, as, for example, the transmission gears and the engine, the cab is unlatched so that it can be tilted around a forward axis extending transversely of the vehicle and thus expose the engine parts for easy access.

This invention is concerned with the fact that, when the driver's cab is tilted, the transmission mechanism is not damaged or destroyed. It is commonplace for the driver to put the transmission in gear while the vehicle is stopped in order to prevent unintentional rolling of the vehicle. In this condition, if the cab were then unlatched and tilted, the transmission mechanism could be damaged or destroyed. The object of this invention is to eliminate this danger in a vehicle having the gear shift lever mounted on the steering wheel column. Another object is to construct the control rod and the transmission shifting linkage so that the cab can be tilted without risking damage to the transmission regardless of whether the transmission is in gear or not.

In this invention, the lower end of the control rod mounted parallel to the steering wheel column acts upon two linkages, one of which selects a gear when the rod is moved parallel to its longitudinal axis and the other of which shifts the selected gear when the rod is turned or rotated around its longitudinal axis.

Thus, in this invention, the coupling between the control rod and the two linkages lies within the range of the tilting axis of the cab. A feature of this invention is in that the lower end of the control rod is joined to a shaft which is connected by ball joints to the bearing plates of the linkages so that in neutral gear position the axis of the shaft and bearings coincide with the tilting axis of the cab. The corresponding linkage operated by longitudinal movement of the control rod includes a crank which pivots on an axis parallel to the tilting axis of the cab at a point mounted at the center of a circle tangent to the tilting axis of the cab.

Figure 2:
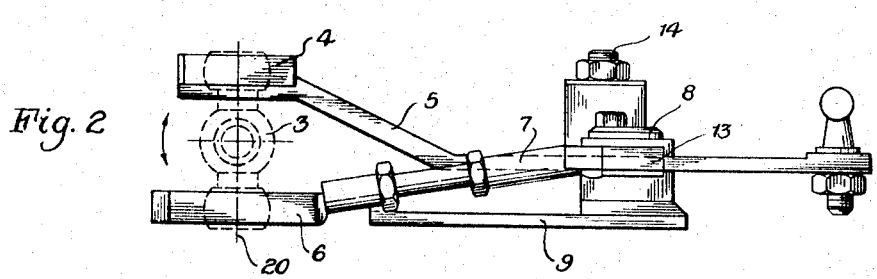
Figure 3:
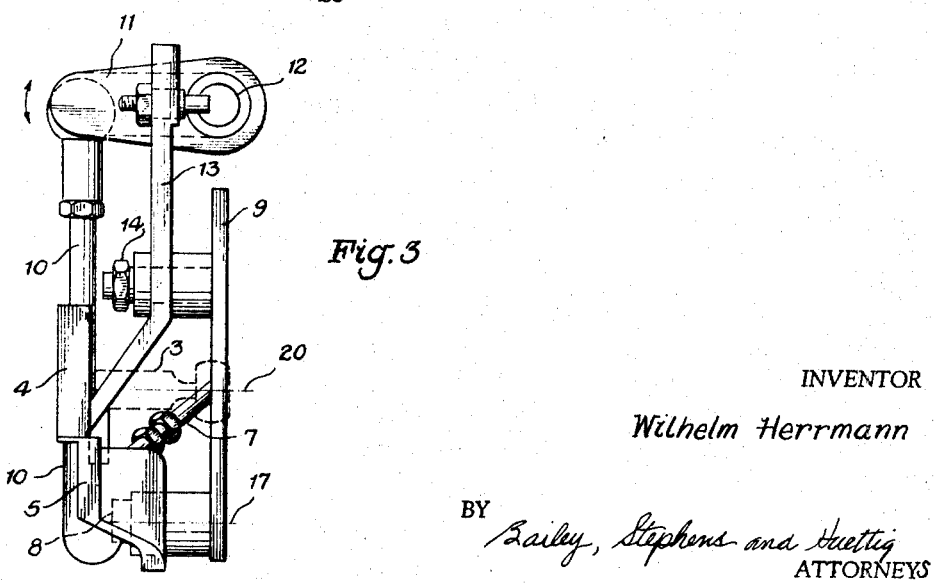

The means by which the objects of the invention are obtained are described more fully with reference to the accompanying drawings in which:

FIGURE 1 is a front elevational view of the linkage;
FIGURE 2 is a plan view of FIGURE 1;
FIGURE 3 is a side elevational view of FIGURE 1;
FIGURE 4 is a schematic front view of a modified form of linkage; and
FIGURE 5 is a plan view of FIGURE 4.

It will become apparent from the linkage shown in the drawings that the cab can be tilted when the engine is in gear without the risk that the linkage system or the transmission itself can be damaged or destroyed.

As shown in FIGURE 1, the control rod 1 is adapted to be mounted parallel to a steering wheel column and joined to a control lever positioned adjacent the steering wheel. This rod 1 is turnable or rotatable around its longitudinal axis 2 and can be moved along its longitudinal axis upwardly or downwardly by the control lever. The lower end of rod 1 is rigidly connected to a transverse shaft 3. The ends of shaft 3 are pivotally mounted by ball joints in bearing plates 4 or 6 and the ball joint in plate 4 can be moved clockwise or counterclockwise in FIGURE 2. Plate 4 is connected to an arm 5 which is bent to be offset and forming part of a linkage. Plate 6 is connected to a linkage arm 7. Arm 5 is part of a crank having its elbow pivotally held by a pin 8 so that it can be swung in a vertical plane and pin 8 is fixed to vehicle frame 9. The crank arm 5 has its other end connected to a coupling rod 10 which is joined to a lever 11 connected to the transmission shaft 12. Vertical movement of rod 10 will therefore turn or rotate shaft 12.

Linkage arm 7 connects plate 6 to a pivot point 7a at one end of a lever 13 which is fulcrumed on a pin 14 mounted on frame 9. The upper end of arm 13 is connected by a ball joint 15 to a rod 16 which is joined to transmission shaft 12 by way of an eye 16a.

When control rod 1 is moved along its longitudinal axis 2, the transmission axis shaft 12 is rotated along its longitudinal axis by way of the upward or downward movement of transverse shaft 3, plate 4, arm 5, rod 10 and lever 11. This selects the desired gear to be shifted. When rod 1 is rotated or turned around its longitudinal axis 2, the shaft 12 is moved along its longitudinal axis as the ball joint in bearing plate 4 can be displaced clockwise or counterclockwise and movement takes place through bearing plate 6, arm 7, arm 13, joint 15 and rod 16. This shifts the gear into the desired position.

The linkage of this invention is such that the longitudinal axis of pin 8 lies in the center of a circle having a radius 18 and whose circumference 19 is tangent to the control rod axis 2 and which intersects the cab tilting axis 20 and in which the axis of the transverse shaft 3 coincides in the neutral position of rod 1. Consequently, the position of the linkage between the shaft 3 and the shaft 12 is largely independent of the inclination of rod 1. This means that rod 1 can have its upper end in the cab and move with the cab when the cab is tilted around axis 20 without altering to any material extent the position of transmission shaft 12 and thus without causing any damage. The cab can be tilted at any time with the gear shifted in any position by shift 12.

In the modification of FIGURES 4 and 5, the arm 7 is replaced by a flat offset arm 70 which is connected by a fork 21 and pivot bearing 22 to crank arm 13. As arm 70 is bent downwardly, the arrangement is such that the axis of bearing 22, axis 17 and axis 20 lie on a straight-line and in one plane. This means that the levers can be swung into closer communication than is possible in FIGURE 1 to the common circle 19 so that the tilting of the cab has hardly any influence, if at all, on the movement of transmission shaft 12.

For purposes of efficient production, it is possible to use the transmission linkage of this invention for fixed cab vehicles as well as tiltable cab vehicles. The transmission linkage differs for a tiltable cab only in the fact that care must be made to position the tilting axis of the cab as described heretofore. Consequently, the linkage while designed for a tiltable cab is not confined to such use.

Having now described the means by which the objects of the invention are obtained,

I claim:

1. A transmission gear shifting linkage for a tiltable vehicle cab comprising a cab tilting axis, a control rod adapted to be actuated by a gear shift lever in the cab, a control rod shaft (3) having an axis coinciding with the cab tilting axis, a transmission shaft (12), first ball joint and linkage means connecting one end of said control rod shaft to said transmission shaft for rotating said transmission shaft and selecting the gear to be shifted when said control rod is moved along its longitudinal axis, and second ball joint and linkage means connected to the other end of said control rod shaft and to said transmission shaft for moving said transmission shaft longitudinally for shifting the gear when said control rod is rotated around its longitudinal axis.

References Cited

UNITED STATES PATENTS

| | | | |
|---|---|---|---|
| 2,762,236 | 9/1956 | Adloff | 74—477 |
| 2,854,088 | 9/1958 | Dence | 180—77 |

FRED C. MATTERN, JR., *Primary Examiner.*

B. T. CALLAHAN, *Assistant Examiner.*